Aug. 23, 1949.  L. B. HALLMAN, JR  2,479,567
RADIO POSITION DETERMINING SYSTEM
Filed Feb. 11, 1941  3 Sheets-Sheet 1
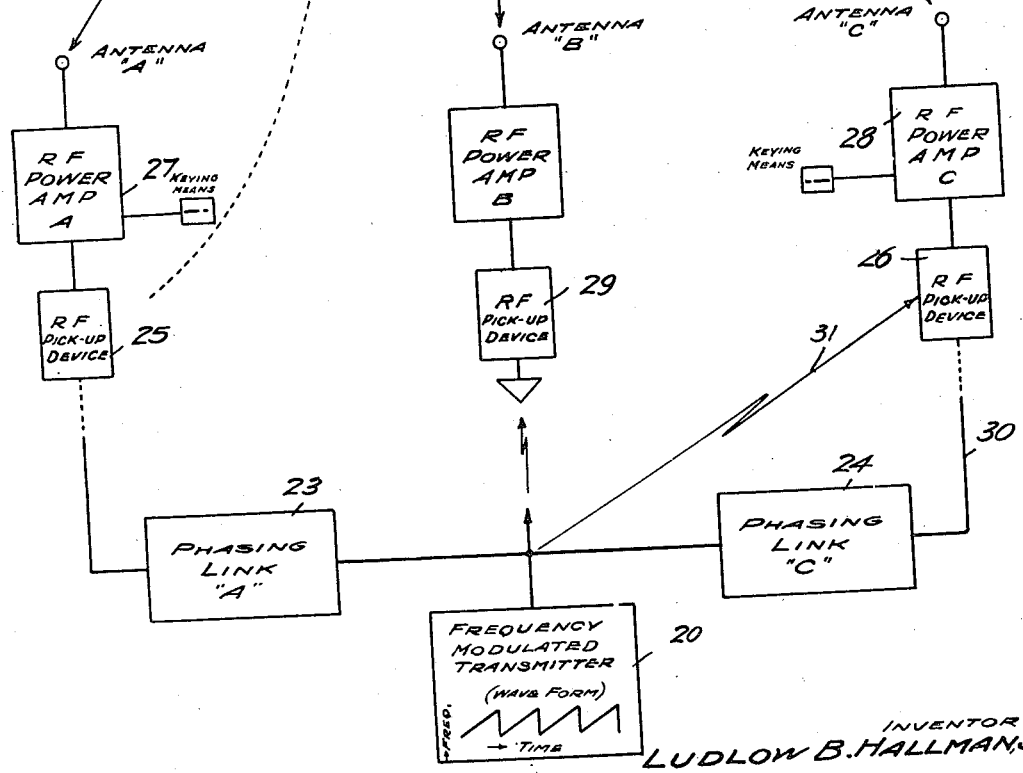

Aug. 23, 1949.  L. B. HALLMAN, JR  2,479,567
RADIO POSITION DETERMINING SYSTEM
Filed Feb. 11, 1941  3 Sheets-Sheet 2
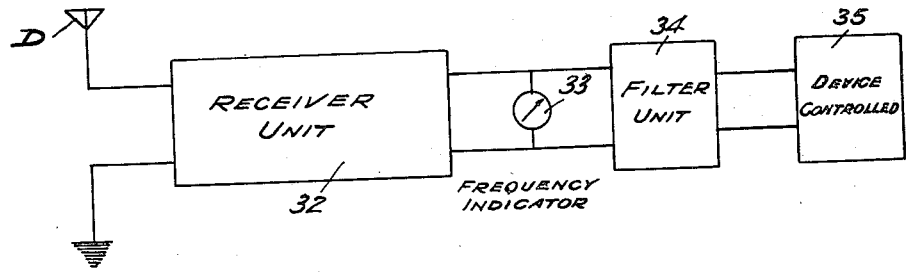
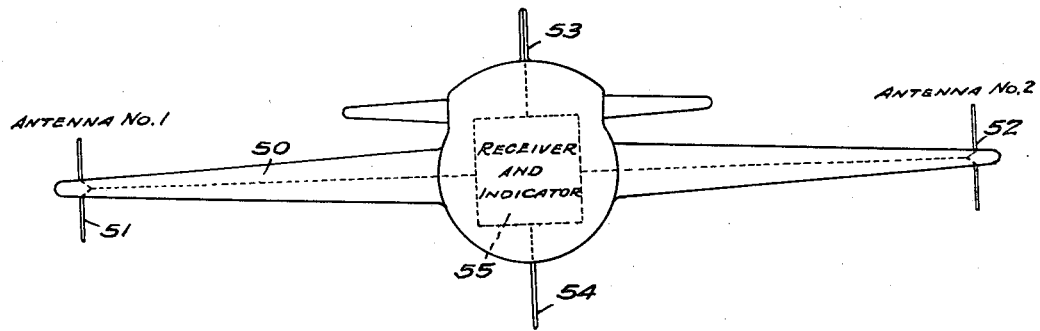
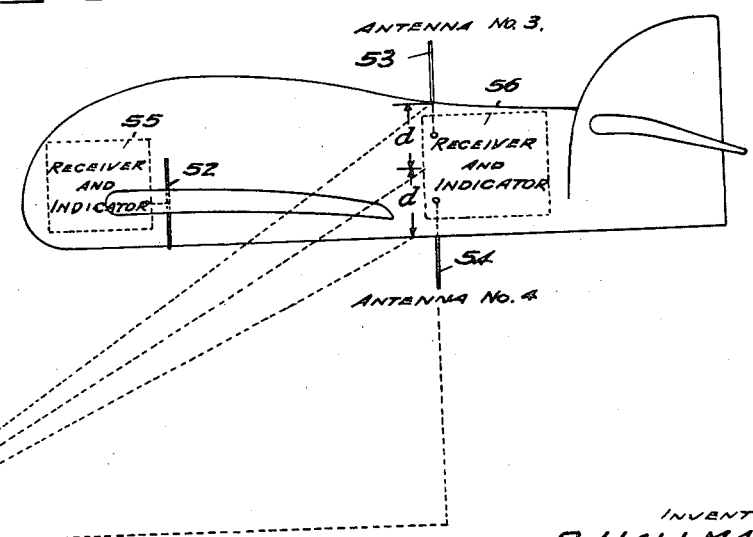
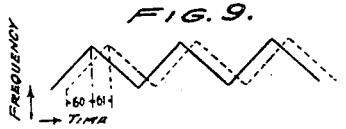
INVENTOR
LUDLOW B. HALLMAN, JR.
BY
William D. Hall.
ATTORNEY

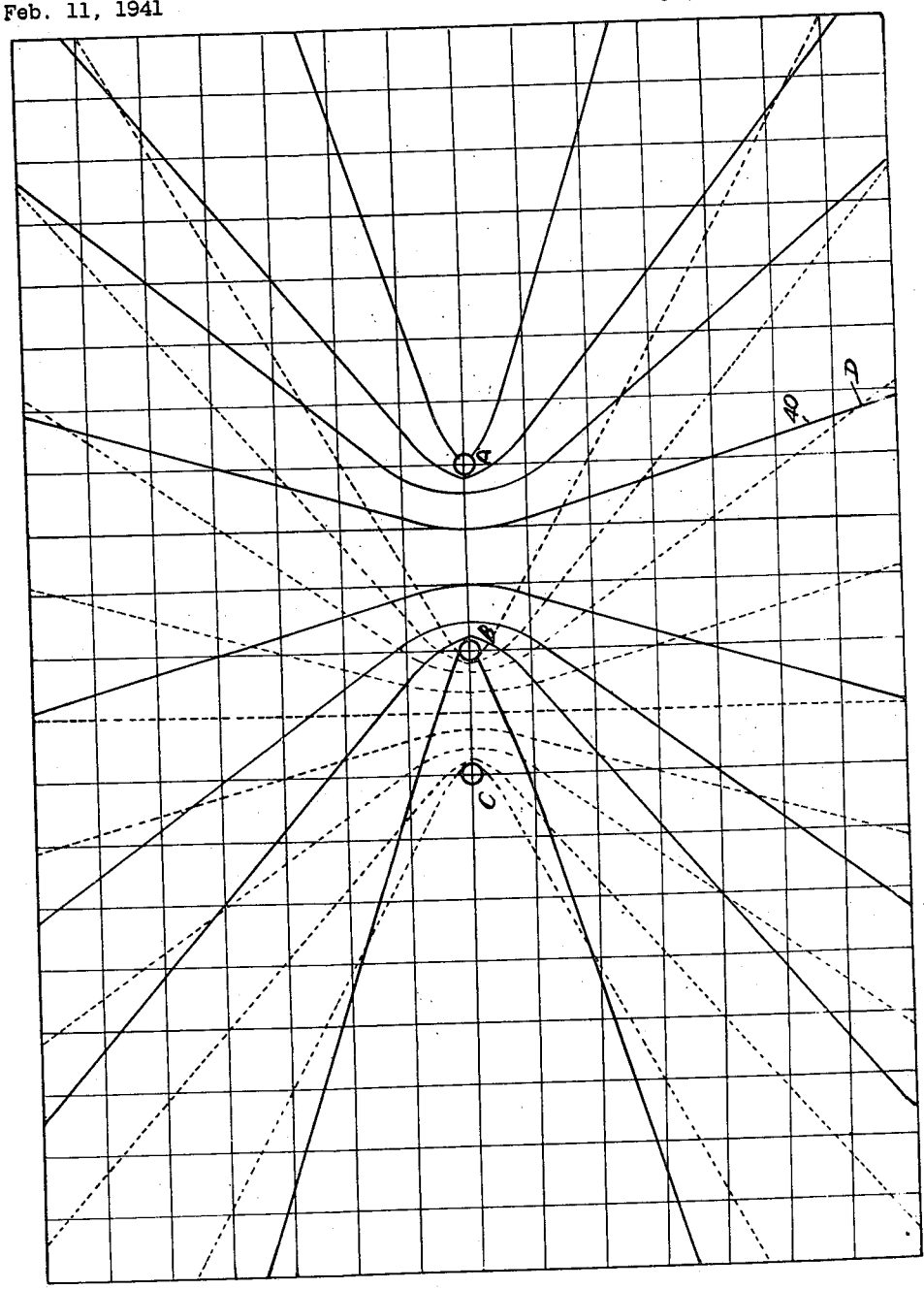

Patented Aug. 23, 1949

2,479,567

UNITED STATES PATENT OFFICE

2,479,567

RADIO POSITION DETERMINING SYSTEM

Ludlow B. Hallman, Jr., Dayton, Ohio, assignor to the United States of America as represented by the Secretary of War Application February 11, 1941, Serial No. 378,389

6 Claims. (Cl. 343—104)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio systems and more particularly to means for location and for control by radio. It has for its principal object the provision of simple means whereby the position of a point in space may be determined, the provision of means guiding an object through space along a predetermined line or to a given point; for example, guiding an aircraft into an airport, and the provision of certain novel methods and apparatus which will become apparent as this description proceeds.

In carrying out the invention, two frequency-modulated carriers reach a receiver on an aircraft. The phase difference between the waves reaching the receiver determines the beat note between the waves and the pitch of the beat note aids the operator in ascertaining his position. By filtering the output of the receiver, the apparatus may be arranged to control mechanism of various kinds. Preferably the transmitting antenna radiates waves in which the frequency/time curve has a saw-toothed shape.

Further details of my invention will become apparent from the accompanying drawings in which Figure 1 is a diagrammatic view of one form of the invention. Figure 2 illustrates the combined wave at the receiver. Figure 3 illustrates the convergence of two flight paths on the receiver. Figure 4 is a block diagram of a receiving system that may be used with the invention. Figure 5 is a front view of an airplane having a modified form of receiving equipment thereon. Figure 6 is a side view of the airplane of Figure 5. Figure 7 shows the time phase of the signals transmitted from the antennas of Figure 1. Figure 8 is a plan view of the transmitting antennas of Figure 1 and also shows the lines of constant beat frequencies in a horizontal plane. Figure 9 illustrates the wave shape of certain frequency modulated devices of the prior art.

With reference to Figure 1, a transmitter 20 generates a frequency-modulated wave of the shape shown in Figure 2. That is, the wave changes from its minimum frequency of say 100,000 kilocycles at time 21 to 100,200 at time 22. The wave then falls in frequency as rapidly as practically possible so that at time 22a it is again at 100,000 kilocycles. The waves generated by transmitter 20 do not reach the several antennas A, B, and C instantly but require short time intervals to reach these antennas. The waves may be transmitted from transmitter 20 to the antennas by any well known means; for example, by simple transmission lines. With this mode of transmission, the phase difference between the waves radiated by the antennas will depend on the respective lengths of the lines. While it is possible to carry out my invention if the waves are radiated from all three antennas A, B, and C in phase, it is desirable to have differences in phase at the antennas. Moreover, it is desirable to be able to change the phase difference at will. A simple transmission line to each antenna can be made to give a predetermined phase shift but I desire to include phasing links 23 and 24 in at least two of the lines. The energy then goes to the R. F. pick-up devices 25 and 26, and eventually to the R. F. power amplifiers 27 and 28 respectively. These feed antennas A and C.

While it is possible to transmit the energy from transmitter 20 to all three antennas by a wire transmission line (with or without phasing links and R. F. pick-up devices) it is also possible to omit the lines and transmit the energy from 20 to the antennas by radio. For example, in Figure 1, the transmitter 20 radiates a wave to R. F. pick-up receiving device 29 which feeds radio-frequency energy to power amplifier B. It is also possible to feed power partially by radio and partially by wire. For example, it is transmitted from 20 by wire 30 to R. F. pick-up receiving device 26 and also by radio directly as indicated by arrow 31.

The energy radiated from the three vertical antennas A, B, and C is received by the equipment shown in Figure 4 which may be located on an aircraft. The equipment of Figure 4 includes a receiver 32, a frequency indicator 33 for measuring the beat note between two frequency-modulated waves, a filter unit 34 which admits either of say two frequencies therethrough, rejecting all others, and a "device controlled" 35 which may be a bomb release device.

When two frequency-modulated waves are received by an antenna D which is remote from A and B, certain beats will exist between the waves due to the phase difference of the waves. For example, in Figure 2, the wave 21—22 is set up at D due to antenna A and will beat with the wave 36—37 from antenna B, effecting beats the frequency of which is 39. For a short interval there will also be beats of the frequency 38. The exact frequency 39 is indicated on the frequency meter 33 and when it is a predetermined value it passes through the filter 34.

By using an indicator 35 on the output of 34 it is possible for the airplane to fly a predetermined course by merely holding the course such that a given frequency occurs at 35. For example, in Figure 1, the pilot may follow course 40 by guiding his plane such that a constant frequency of say 80,000 cycles occurs at 35.

The beat frequency will be analyzed for point D in space. The frequency 39 (during time T) is given by the formula:

$$f_m = f_f F_a [|(r_3/v_3 + \alpha_3) - (r_1/v_1 + \alpha_1)|]$$

Where $f_m$ is the beat frequency received by the receiver; $f_t$ the frequency of the saw-toothed modulation which, in other words, is $$\frac{1}{T+a}$$

$F_a$ is the total frequency change (39+38) during a modulation cycle $(T+a)$; $r_3$ and $r_1$ the respective distances from A to D and from B to D; and $v_3$ and $v_1$ the respective velocities of radio waves from A to D and from B to D. $\alpha_3$ and $\alpha_1$ are respectively the relative time-phase relations of the voltages at antennas A and B with respect to transmitter 20. As a matter of illustration: Assume $\alpha_3 = \alpha_1 = 0$, $v_3 = v_1 = 186,000$ miles per second, $r_3 = 25$ miles, $r_1 = 20$ miles, $F_a = 200,000$ cycles per second and $f_f = 15,000$ cycles per second, then:

$$f_m = 15,000 \times 200,000 \times \frac{25-20}{186,000} =$$

80,700 cycles/second

By similar calculations one would find that at 212 feet either side of point D the frequency $f_m$ would be about 80,000 cycles per second or 81,400 cycles per second, depending on which side of D one passed. Consequently, as long as one maintains his flying course such that he receives waves between 80,000 and 81,400 cycles per second, he will pass within about 212 feet of point D. When he passes point D he also receives beats between transmitters B and C of another given frequency. When he receives both of these frequencies simultaneously he knows he is over point D or within a few hundred feet of it.

The filter unit 34 is adjusted to admit the two frequencies that occur only when the plane passes point D. When both of these frequencies pass to the "device controlled" 35, the latter releases bombs, or otherwise gives a signal.

In order that there will be no beats between radiators A and C but merely beats between A and B as well as between B and C, a special transmission system is used. In Figure 7 it is shown that antenna A is keyed to send the letter "n" in code and the antenna C sends the letter "a." The dots and dashes of the antenna A occur at times when antenna C is silent and vice versa. Consequently, antennas A and C are never energized simultaneously and both have beats respecting antenna B but not respecting each other. Hence, in the pattern of Figure 8, it is obvious that the dotted lines show the reaction between antennas B and C whereas the solid lines show the reaction between antennas A and B. These lines are constant-frequency lines that is, at every point on a given solid line, the operator will receive a given frequency due to the reaction of the waves from antennas A and B.

The foregoing illustrates the form of my invention wherein two or more radiating antennas are used whereas Figures 5 and 6 illustrate the form wherein only a single transmitting antenna is used but in which several receiving antennas are employed. In these figures an airplane 50 has antennas 51 and 52 which feed one receiver 55 and antennas 53 and 54 which feed a second receiver 56 and are equally spaced a distance $d$ therefrom. If indications in a horizontal plane are all that is desired, receiver 56 and its associated antennas 53 and 54 may be dispensed with.

The receivers 55 and 56 are primarily frequency-modulation receivers; that is, they respond uniformly to all frequencies constituting the frequency-modulated waves and are not necessarily affected by amplitude modulation.

Considering merely the horizontal plane characteristics we see that as long as the nose of the airplane 50 is pointing directly at the single vertical radiator 57 there will be no beats between the signals received by antennas 51 and 52. However, should the airplane be flying such that antenna 51 is closer to the transmitter 57 than is antenna 52, certain beats will occur. The drawing shows the antennas 51 and 52 electrically and physically equally spaced from the receiver 55. It is of course possible to displace one of these antennas electrically farther from receiver 55 than the other so in flying into the landing field the pilot can have a constant beat rather than a zero beat.

Considering antennas 53 and 54 it is noted that so long as the nose of the airship is pointing toward the radiator 57 the beats in the receiver 56 will not occur. Should the nose point up or down too much, however, beats will occur.

It is apparent from the foregoing description that points in space may be located by determining the beat frequency between the frequency-modulated waves. To completely locate the point in only one plane requires three waves whereas to locate a point in space requires four waves. To map out a given line of approach or attack in a single horizontal plane requires only two waves.

In the prior art it has been proposed to combine triangular waves of the shape shown in Figure 9. In such combinations there is produced a relatively constant frequency for the time interval 60 and a varying frequency during time interval 61. With my idea, there are produced only two frequencies both of which are unvarying throughout their duration. Certain claims are directed to protecting by these Letters Patent the wave shapes of Figure 2 in certain applications where waves having the shape shown in Figure 9 are now used to produce beats.

When the claims refer to determining position they do not necessarily call for determination of all bearings of the position but to determining any bearing.

It is of course possible for the airplane of Figure 5 (with either two or four antennas) to receive waves on the pattern of Figure 8 from a transmitter having three antennas A, B, and C. When this is done complete foci of the point in space may be determined by analyzing all of the beat frequencies.

I claim to have invented:

1. In a position-determining device, two similar receiving radio antennas at the location whose position is to be determined in fixed relation to each other, means comprising a radiator for transmitting frequency modulated radio waves from a known position whereby said antennas are energized by frequency-modulated radio waves, and receiving means responsive to the phase difference between the waves that energize said antennas for determining position.

2. In an aircraft course-determining device, a plurality of spaced receiving antennas at opposite ends of a wing respectively, receiving means responsive to difference in frequency between waves received by said antennas for determining course, and means in the path of the course for radiating frequency modulated waves that have a portion wherein the change of frequency is linear.

3. In a device for determining the position of an aircraft, transmitting means that produces a frequency-modulated wave in which the frequency at intermittent intervals varies linearly, receiving means responsive to beat frequencies between frequency modulated waves, and means comprising a plurality of antennas that receive energy from the transmitter and supply it to the receiver in such a manner as to produce beats in the receiver the frequency of which depend on the relative position of the transmitter and receiver.

4. A device for receiving frequency-modulated waves comprising a pair of spaced non-directional antennas, a frequency-modulated-wave receiver that depends primarily for its response on frequency modulation, whereby the same is relatively non-responsive to amplitude modulation, and means combining the waves received by said antennas and impressing the same on said receiver.

5. The device of claim 4 in which the last-named means of claim 4 displaces the phase of waves received from one of the antennas more than of the other.

6. In a device for determining the position of an aircraft, transmitting means that produces a frequency-modulated wave in which the frequency at intermittent intervals varies linearly, said transmitting means including a single transmitting antenna; receiving means responsive to beat frequencies between frequency modulated signals, and means comprising a plurality of antennas that receives energy from said transmitting means and supply it to the receiver in such a manner as to produce beats in the receiver the frequency of which depends on the relative position of the transmitting antenna and said aircraft.

LUDLOW B. HALLMAN, Jr.

REFERENCES CITED

The following references are of record in the file of this patent:

UNITED STATES PATENTS

| Number | Name | Date |
|---|---|---|
| 2,071,564 | Nicolson | Feb. 23, 1937 |
| 2,148,267 | Honore | Feb. 21, 1939 |
| 2,183,562 | Hansell | Dec. 19, 1939 |
| 2,206,903 | Lane et al. | July 9, 1940 |
| 2,218,907 | Donnelly et al. | Oct. 22, 1940 |
| 2,226,860 | Greig | Dec. 31, 1940 |

FOREIGN PATENTS

| Number | Country | Date |
|---|---|---|
| 811,700 | France | Jan. 23, 1937 |
| 672,104 | Germany | Feb. 22, 1939 |

OTHER REFERENCES

Electronics for March 1939, Cover and pp. 14–17 and 81–85.

Communications, January 1940, pp. 5, 6, and 35.